Aug. 25, 1953 D. M. WOOD 2,649,929
LUBRICATING MEANS
Filed Jan. 12, 1952
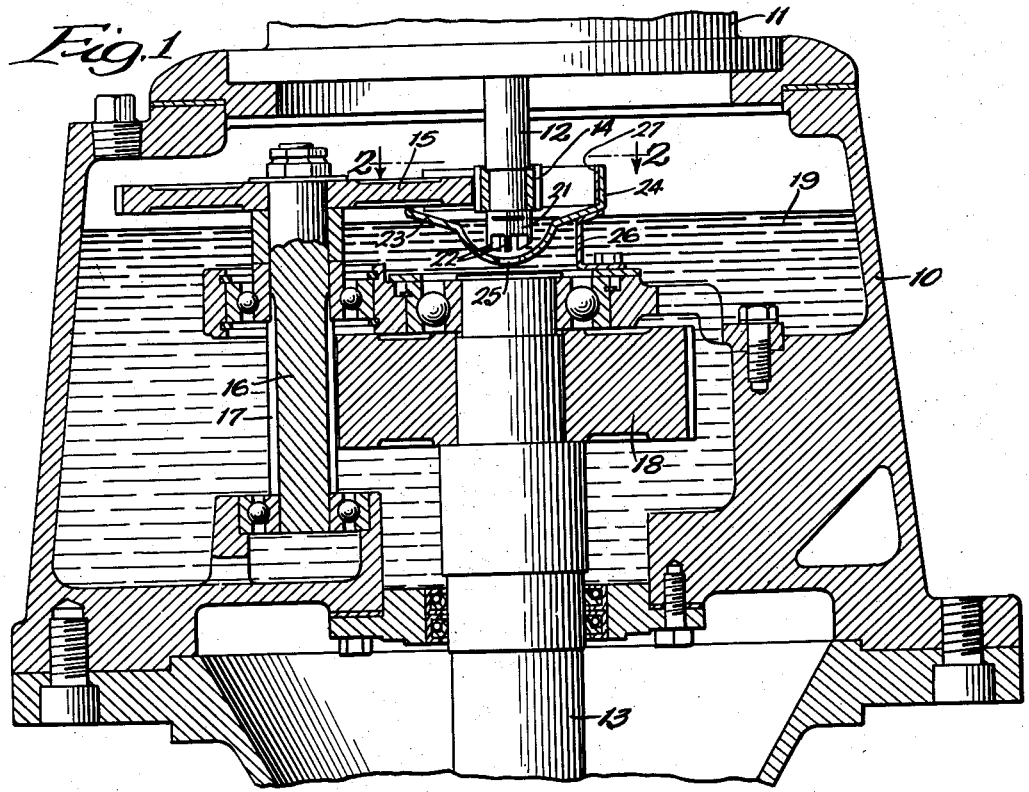
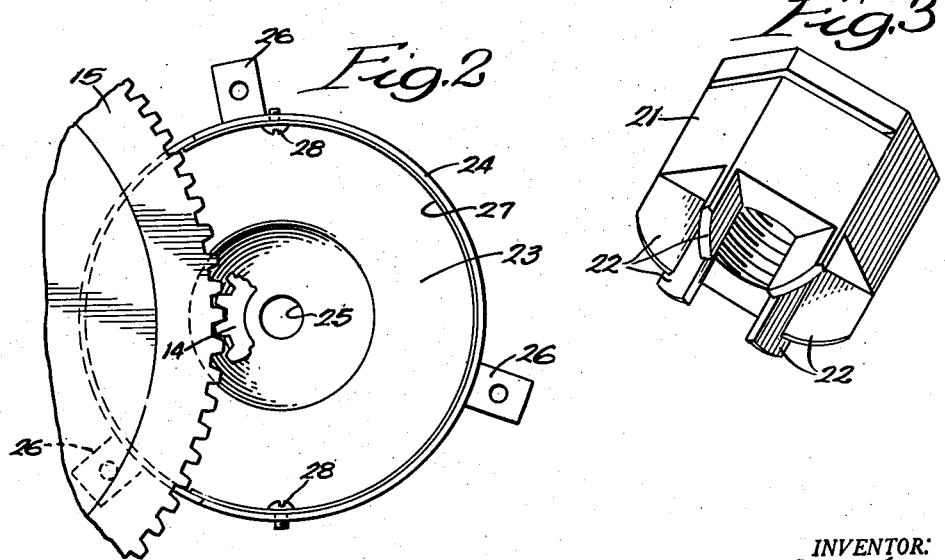
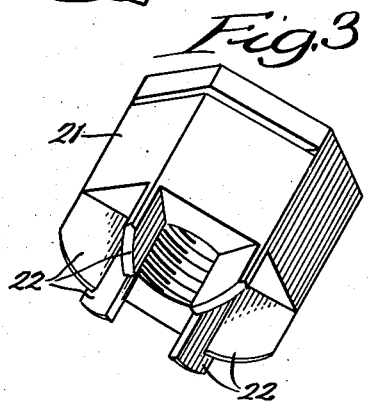
INVENTOR:
Davis M. Wood,
BY
E. S. Borth.
ATTORNEY.

Patented Aug. 25, 1953

2,649,929

UNITED STATES PATENT OFFICE 2,649,929

LUBRICATING MEANS

Davis M. Wood, Chicago, Ill., assignor to Foote Bros. Gear and Machine Corporation, Chicago, Ill., a corporation of Delaware Application January 12, 1952, Serial No. 266,193

9 Claims. (Cl. 184—13)

This invention relates to a vertical gear unit and more particularly to the lubrication of the high speed gears in a vertical gear reducer.

In vertical type gear reducers, it has been customary to mount the high speed gears at the top of the unit with the low speed gears therebelow. The casings of the units have been filled with lubricant to a level to submerge the low speed gears so that they are adequately lubricated. It is undesirable, however, to submerge the high speed gears in lubricant, because they would produce excessive agitation of the lubricant and heat. It has therefore been customary to maintain the lubricant level below the high speed gears to provide a separate pump to circulate lubricant from the casing over these gears. This construction is relatively expensive, reduces the efficiency of the unit due to pump drag and may result in damage to or destruction of the high speed gears in the event of pump failure.

It is accordingly one of the objects of the present invention to provide a vertical gear unit in which the high speed gears are adequately lubricated through a mechanism which is extremely simple and inexpensive in construction, which is reliable in operation and which provides a minimum drag on the unit.

Another object is to provide a vertical gear unit in which lubricant is forced over the gears by impeller vanes connected to rotate with one of the gears and extending into the body of lubricant.

According to one feature, the vanes may be formed on a fastening nut which holds the high speed driving gear on its shaft to project downwardly into the lubricant in the casing.

Still another object is to provide a vertical gear unit in which lubricant is directed over the gears by a simple dished guide member which fits over the impeller vanes.

In the preferred construction, the guide member substantially encloses the high speed driving gear and is cut away at one side to receive a portion of the gear which meshes with the high speed driving gear.

According to another feature of the invention, the guide member is of standard construction to be used with different sized gear sets and a strip is secured therein with its ends lying adjacent to the second gear to direct lubricant over the high speed meshing surfaces.

The above and other objects and features of the invention will be more readily apparent when read in connection with the accompanying drawings, in which:

Figure 1 is a partial vertical section through a vertical gear unit embodying the invention;

Figure 2 is a partial horizontal section on the line 2—2 of Figure 1; and

Figure 3 is a perspective view of the vaned nut.

The gear unit as shown comprises a casing 10 adapted to contain the gearing and which is mounted in vertical position. A driving motor 11 may be mounted on top of the casing and has its shaft 12 projecting downwardly into the casing. The output shaft of the unit as indicated at 13 extends upwardly into the casing in alignment with the motor shaft 12 and is adapted to be driven by the motor at reduced speed and increased torque. It will be understood, of course, that where the speed is to be increased, the motor might drive the shaft 13 and the shaft 12 could be the high speed output shaft.

The shaft 12 carries a small driving gear 14 which meshes with a second gear 15 secured to a vertical countershaft 16 which is spaced from the shafts 12 and 13. The shaft 16 also carries a reduced gear shown as formed by gear teeth 17 cut directly into the shaft and meshing with a large gear 18 on the low speed shaft 13. With this construction the shafts 12 and 13 are geared together so that the shaft 13 will turn at a substantially lower speed than the shaft 12, as determined by the relative size of the several gears.

To lubricate the gears, the casing 10 is filled with a body of lubricant 19 to a level above the gears 17 and 18 but below the high speed gears 14 and 15. In this way the low speed gears and the several bearings for the shafts are adequately lubricated.

To lubricate the high speed gears according to the present invention, impeller vanes are associated with the high speed shaft 12 to circulate lubricant over the gears 14 and 15. As shown, the gear 14 is held on the motor shaft by a nut 21 which is provided at its lower end with a series of generally radially extending vanes 22 which project from the nut body into the lubricant 19. As the high speed shaft rotates, the vanes 22 function as a pump impeller to cause a flow of lubricant from the upper part of the lubricant body.

The lubricant is directed over the gears by a dished guide member 23 having a cylindrical upper rim 24 which encircles and registers with the gear 14 and a dished lower portion which underlies the impeller vanes 22. Centrally of its bottom the guide member 23 is formed with a lubricant inlet opening 25 through which lubricant can flow into the vanes 22. At one side the rim portion 24 is cut away, as best seen in Figure 2 so that a portion of the gear 15 extends into the guide member. The guide member may be supported in position by brackets 26.

Preferably the guide member is so designed that guide members of the same size can be used with different sizes of gear reducers. For this purpose the side of the cylindrical portion 24 is cut away to the extent necessary to receive the largest gear 15 with which the unit is to be used. In order that the guide member may encompass the gear 15 closely, a flexible strip 27 of substantially the same width as the cylindrical portion 24 is fitted into the cylindrical portion 24 and secured therein by screws 28. By selecting a strip 27 of the proper length, the ends thereof can be made to terminate relatively close to the periphery of the gear 15 as shown in Figure 2.

With this construction, when the shafts are turning the vanes 22 will draw lubricant in through the opening 25 and will cause the lubricant to flow radially outward and upward in the guide member. The lubricant so flowing, will splash over the driving gear 14 and will flow out through the cut away portion of the rim 24 over the meshing surfaces of the gears 14 and 15. These gears are thus adequately lubricated by means of a very simple construction which imposes a minimum of drag on the operation of the unit. Due to the simplicity of the construction and the lack of relatively moving parts, there is no possibility of failure so that the gears are properly lubricated at all times.

While one embodiment of the invention has been shown and described in detail herein, it will be understood that this is illustrative only and is not to be taken as a definition of the scope of the invention, reference being had for this purpose to the appended claims.

What is claimed is:

1. A vertical gear unit comprising a casing to hold a body of lubricant, a pair of intermeshing gears in the casing rotatable on spaced vertical axes and lying above the level of the lubricant in the casing, an impeller member carried by one of the gears and having generally radially extending vanes thereon projecting downward into the lubricant in the casing and a dished guide member around the impeller member to direct lubricant displaced by the impeller member against the gears, the dished guide member having a lubricant inlet opening therein below the normal level of lubricant in the casing.

2. A vertical gear unit comprising a casing to hold a body of lubricant, a pair of intermeshing gears in the casing rotatable on spaced vertical axes and lying above the level of the lubricant in the casing, an impeller member carried by one of the gears and having generally radially extending vanes thereon projecting downward into the lubricant in the casing and a cup shaped guide member fitting around said one of the gears and the impeller member and having an opening in its lower part through which lubricant can flow into the guide member, the guide member being cut away at one side to receive a portion of the other gear.

3. A vertical gear unit comprising a casing to hold a body of lubricant, a vertical shaft extending into the top of the casing, a gear carried by the shaft above the level of lubricant in the casing, a vertical countershaft spaced from the first named shaft, a pair of vertically spaced gears on the countershaft one of which lies above the level of lubricant in the casing and meshes with the first named gear and the other of which lies below the level of lubricant in the casing, a third vertical shaft spaced from the countershaft, a gear on the third shaft meshing with said other gear on the countershaft, an impeller member carried by the first named shaft and formed with radially extending vanes lying at least partially below the level of liquid in the casing, and a dished guide member fitting around the impeller member to direct lubricant displaced thereby against the gears which lie above the lubricant level, the dished guide member having a lubricant inlet opening therein below the normal level of lubricant in the casing.

4. A vertical gear unit comprising a casing to hold a body of lubricant, a vertical shaft extending into the top of the casing, a gear carried by the shaft above the level of lubricant in the casing, a vertical countershaft spaced from the first named shaft, a pair of vertically spaced gears on the countershaft one of which lies above the level of lubricant in the casing and meshes with the first named gear and the other of which lies below the level of lubricant in the casing, a third vertical shaft spaced from the countershaft, a gear on the third shaft meshing with said other gear on the countershaft, an impeller member carried by the first named shaft and formed with radially extending vanes lying at least partially below the level of lubricant in the casing, and a cup shaped guide member fitting around the first named gear and the impeller member and having an opening in its bottom part through which lubricant can flow into the guide member, the upper edge of the guide member being cut away at one side to receive a portion of the upper gear on the countershaft.

5. A vertical gear unit comprising a casing to hold a body of lubricant, a vertical shaft extending into the top of the casing, a gear carried by the shaft above the level of lubricant in the casing, a vertical countershaft spaced from the first named shaft, a pair of vertically spaced gears on the countershaft one of which lies above the level of lubricant in the casing and meshes with the first named gear and the other of which lies below the level of lubricant in the casing, a third vertical shaft spaced from the countershaft, a nut secured on the lower end of the first named shaft to hold the first named gear thereon and having radially extending vanes thereon lying at least partially below the level of lubricant in the casing, and a dished guide member fitting around the nut to direct lubricant displaced thereby against the gears which lie above the lubricant level, the dished guide member having a lubricant inlet opening therein below the normal level of lubricant in the casing.

6. A vertical gear unit comprising a casing to hold a body of lubricant, a vertical shaft extending into the top of the casing, a gear carried by the shaft above the level of lubricant in the casing, a second gear meshing with the first named gear, a nut on the end of the shaft holding the first named gear thereon and having radially extending vanes thereon lying at least partially below the level of lubricant in the casing and a dished guide member around the nut to direct lubricant displaced by the vanes against the gears, the dished guide member having a lubricant inlet opening therein below the normal level of lubricant in the casing.

7. A vertical gear unit comprising a casing to hold a body of lubricant, a vertical shaft extending into the top of the casing, a gear carried by the shaft above the level of lubricant in the casing, a second gear meshing with the first named gear, a nut on the end of the shaft holding the first named gear thereon and having radially extending vanes thereon lying at least partially below the level of lubricant in the casing, and a cup shaped guide member fitting around the nut and the first gear and having an opening in its bottom through which lubricant can flow into the guide member, the upper edge of the guide member being cut away at one side to receive a portion of the second gear.

8. A vertical gear unit comprising a casing to hold a body of lubricant, a vertical shaft extending into the top of the casing, a gear carried by the shaft above the level of lubricant in the casing, a second gear meshing with the first named gear, a nut on the end of the shaft holding the first named gear thereon and having radially extending vanes thereon lying at least partially below the level of lubricant in the casing, a cup shaped guide member having a cylindrical upper portion encircling the first gear and a cupped lower portion fitting around the nut and formed with a lubricant inlet opening, the upper cylindrical portion being cut away at the side adjacent to the second gear, and an elongated strip fitting within the cylindrical portion with its ends lying closely adjacent to the second gear.

9. A vertical gear unit comprising a casing to hold a body of lubricant, a vertical shaft extending into the top of the casing, a gear carried by the shaft above the level of lubricant in the casing, a second gear meshing with the first named gear, an impeller member connected to the shaft and having radially extending vanes lying at least partially below the level of lubricant in the casing, a cup shaped guide member having a cylindrical upper portion encircling the first gear and a cupped lower portion fitting around the impeller member and formed with a lubricant inlet opening, the upper cylindrical portion being cut away at the side adjacent to the second gear, and an elongated strip fitting within the cylindrical portion with its ends lying closely adjacent to the second gear.

DAVIS M. WOOD.

References Cited in the file of this patent

UNITED STATES PATENTS

| Number | Name | Date |
| --- | --- | --- |
| 2,035,224 | Emrick | Mar. 24, 1936 |
| 2,054,782 | Day | Sept. 15, 1936 |
| 2,262,239 | Kennelly | Nov. 11, 1941 |